United States Patent [19]

Mizuno et al.

[11] Patent Number: 4,855,261
[45] Date of Patent: Aug. 8, 1989

[54] SEALING GLASS

[75] Inventors: Yasuo Mizuno, Hirakata; Atsushi Nishino, Neyagawa; Masaki Ikeda, Hirakata; Shinji Kurio, Miyazaki, all of Japan

[73] Assignee: Matsushita Electric Industrial Co., Ltd., Osaka, Japan

[21] Appl. No.: 281,538

[22] Filed: Dec. 8, 1988

Related U.S. Application Data

[63] Continuation of Ser. No. 72,295, Jul. 13, 1987, abandoned.

[30] Foreign Application Priority Data

Jul. 17, 1986 [JP] Japan ................. 61-168340

[51] Int. Cl.$^4$ ............... C03C 3/074; C03C 8/10; C03C 8/24
[52] U.S. Cl. .................................. 501/76; 501/15; 501/22
[58] Field of Search ................. 501/15, 22, 76

[56] References Cited

U.S. PATENT DOCUMENTS

| 3,291,586 | 12/1986 | Chapman, Jr. et al. | 501/76 |
| 4,038,091 | 7/1977 | Francel et al. | 501/76 |
| 4,073,657 | 2/1978 | Davis et al. | 501/76 |
| 4,115,132 | 9/1978 | Suzuki et al. | 501/76 |
| 4,184,189 | 1/1980 | Davis et al. | 501/76 |
| 4,251,595 | 2/1981 | Dameswil et al. | 501/76 |
| 4,310,357 | 1/1982 | Matsuura et al. | 501/76 |
| 4,405,722 | 9/1983 | Kokuba et al. | 501/76 |
| 4,515,898 | 5/1985 | Davis et al. | 501/76 |

FOREIGN PATENT DOCUMENTS

| 863500 | 3/1961 | United Kingdom . |
| 1041945 | 9/1966 | United Kingdom . |
| 1501296 | 2/1978 | United Kingdom . |
| 1534868 | 12/1978 | United Kingdom . |

Primary Examiner—Mark L. Bell
Attorney, Agent, or Firm—Stevens, Davis, Miller & Mosher

[57] ABSTRACT

This invention relates to a sealing glass for use in bonding glass, ceramics and metals and specifies the composition of a sealing glass which is workable at moderate temperatures and is excellent in transparency and strength. Amorphous magnetic materials have themselves a crystallization temperature and when used in a magnetic head, the amorphous materials undergo crystallization in assembling the head at a sealing temperature higher than the crystallization temperature and becomes not only brittle but also deteriorated in magnetic characteristics so that the head becomes unsuitable for use. The present glass is advantageously used in such a case.

8 Claims, 3 Drawing Sheets

SEALING GLASS

This application is a continuation of application Ser. No. 072,295, filed July 13, 1987 abandoned.

TECHNICAL FIELD

This invention relates to a sealing glass for use in bonding or sealing of glass, ceramics, metals, and the like.

BACKGROUND OF THE INVENTION

The method of bonding together the bonding portion of a material to be sealed with a low-melting glass has long been used in the manufacture of bulbs and CRT's (cathode ray tubes). With the recent advance in electronics, the sealing or bonding with a glass is finding new uses in bonding or packaging of silicon semiconductors and IC, assembling of liquid crystal display cells, and as the magnetic head gap.

For the purpose of illustrating the prior art, an example of a sealing glass for use in a magnetic head gap is described below.

Figure 2:
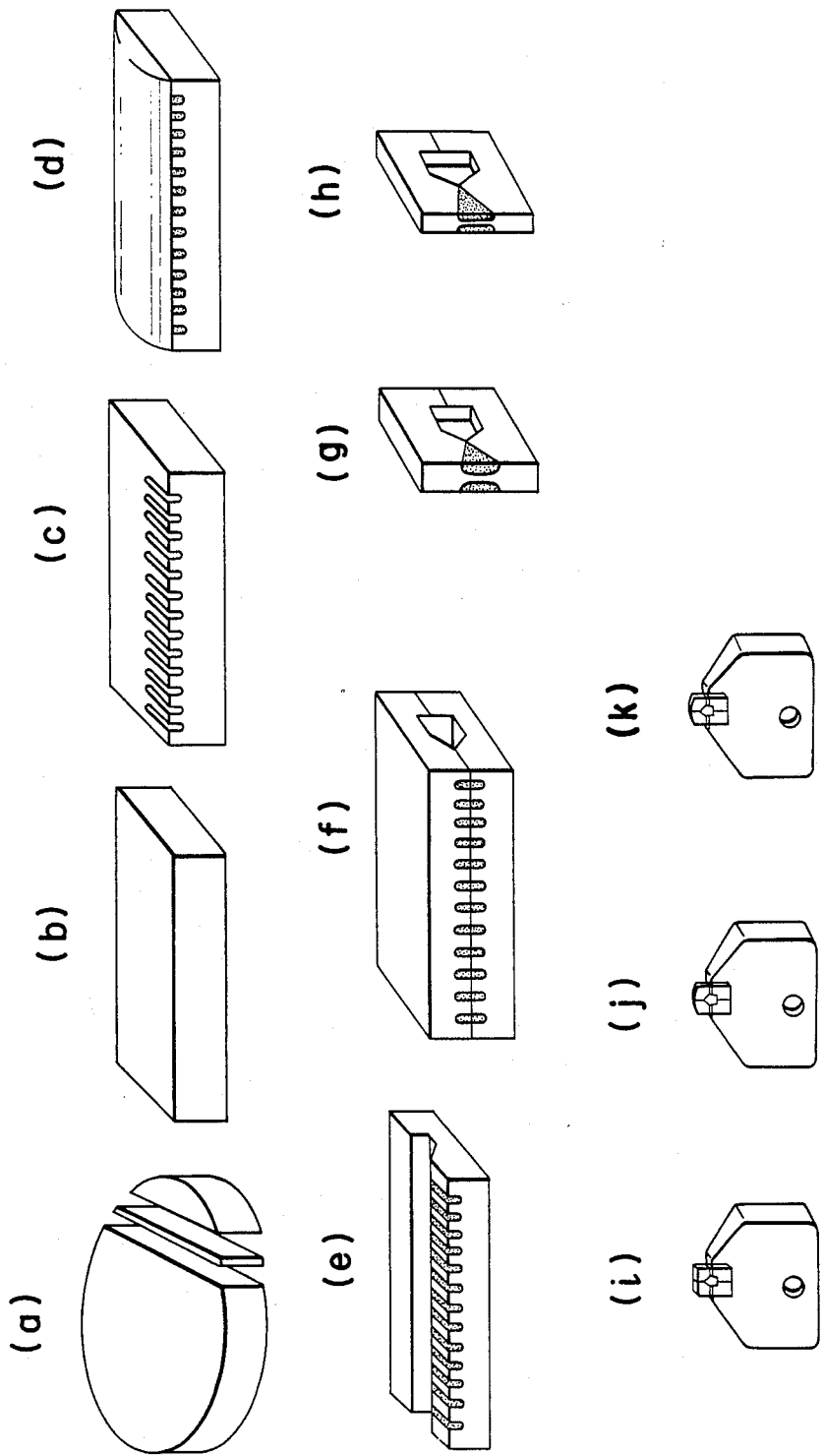
FIG. 2 is a typical flow chart of the production of a magnetic head for VTR (video tape recorder) using the sealing glass of this invention in one embodiment of this invention.
Figure 3:
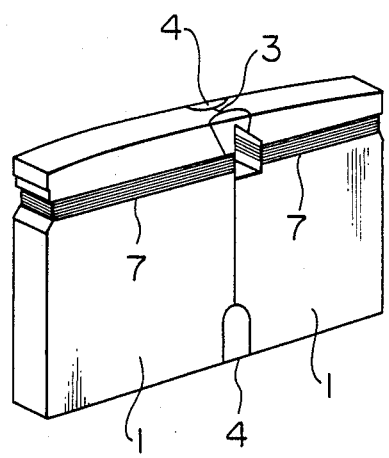
FIGS. 3 and 4 are drawings to illustrate the structure of a magnetic head.

FIG. 2 represents a typical flow chart for making a magnetic head used in VTR (video tape recorder). FIG. 3 shows an example of the magnetic head which was obtained.

As shown in FIG. 2, (a) a raw material is cut from a ferrite ingot, (b) a bar of a suitable size is obtained from the raw material by contour grinding, (c) grooving for the reinforcing glass is performed by track formation, (d) glass is cast in the groove, (e) excess glass is removed by grinding, winding groove is formed by machining, and the gap surface is finished by lapping, (f) a gap glass is applied by sputtering, then bonded to form the gap, (g) the bar thus prepared is cut to chips of intended thickness, (h) the chip is made into a desired size by side grinding, (i) the chip is then bonded to a base, (j) the tape flying surface of the chip is lapped, and (k) the chip is provided with winding to complete a head.

A most popular recording head for the conventional ½-inch video tape recorder is a ferrite head. However, when used in high density signal recording such as 8-mm video tape recorder which has recently made its appearance, the ferrite head having a low saturation magnetic flux density gives rise to a problem in magnetic saturation of the head core material and cannot meet the requirements. For this reason, "Sendust" (a tradename for an iron alloy of 5% of Al, 10% of Si and 85% of Fe) and amorphous materials are attracting attention as a head material to replace the ferrite. However, owing to its poor workability, Sendust is low in the yield of head in fabrication. For this reason, amorphous materials excellent in magnetic characteristics and workability has become spotlighted in place of the Sendust. The fabrication of a head employing an amorphous material includes a step of the amorphous metal sputtering between the steps (b) and (c) and the amorphous material is present in the core denoted by 2 in FIG. 4. However, the amorphous material itself has a crystallization temperature (hereinafter referred to as $T_x$). If the amorphous material is exposed to a sealing temperature higher than $T_x$ during the assembling of a head, it is crystallized and becomes brittle and, at the same time, is deteriorated in magnetic characteristics until it becomes unsuitable for use as a magnetic material. It is, therefore, desirable to seal generally at a temperature below 500° C.

As a sealing glass workable at such a lower temperature, there has been described in Japanese Patent Publication No. 4,728/55 a lead-base glass having a softening point of 361°-393° C. This glass contains as an ingredient a large amount of ZnO which is liable to react with an amorphous material, thus rendering it difficult for a head of small gap length (breadth) to maintain a high-precision gap.

There have also been described in Japanese Patent Application "Kokai" (Laid-open) Nos. 33,112/76 and 55,528/82 a lead-base glass having a point of incipient deformation of 300°-311° C. and a lead-base glass having a softening point of 300°-325° C., respectively. Both glasses contain $PbF_2$ to lower the melting point and, as a consequence, when used as a gap glass, both glasses develop bubbles or haze, thus causing magnetic attenuation of the recorded signal and development of flaws on the tape.

A lead-base glass having a softening point of 399° C. is also described in Japanese Patent Application "Kokai" (Laid-open) No. 108,414/77. Since such a glass contains 1 to 5% of CoO, it is deeply colored, resulting in a drawback such that the gap depth (denoted by 6 in FIG. 4) cannot be adjusted to a prescribed value. These lead-base glasses are generally poor in strength and, as a consequence, show drawbacks such that the reinforcing glass (denoted by 4 in FIG. 3) is susceptible to cracking caused by a cutter in the cutting step (g) of FIG. 2, resulting in breakage of the head.

By taking into account the above examples of prior art, the performance characteristics required for a sealing glass for use in a VTR head employing amorphous magnetic materials include (1) sufficient fluidity at a working temperature of 500° C. or below, (2) inertness to head materials such as amorphous materials and ferrite materials, (3) transparency with no deep color, no bubbles and no haze, (4) sufficient strength to withstand breakage in the cutting step, and (5) excellent chemical durability.

DISCLOSURE OF THE INVENTION

An object of this invention is to provide a sealing glass which is not liable to react with amorphous materials, is free from bubble formation inside the glass, and is excellent in transparency and strength.

The above object is achieved by a glass of the composition comprising, in terms of percent by weight, at least 2 to 7% of $SiO_2$, 4 to 11% of $B_2O_3$, 70 to 85% of PbO, 1 to 7% of ZnO, 1 to 5% of $Al_2O_3$, and 3 to 15% of CdO, said glass composition being based upon the finding that by incorporation of CdO in a lead-base glass, it is possible to improve the strength without impairing other requisite characteristics. More desirably the present sealing glass is characterized by comprising 3.5 to 5.5% of $SiO_2$, 8 to 9% of $B_2O_3$, 73 to 75% of PbO, 2 to 6.5% of ZnO, 1 to 2.5% of $Al_2O_3$, and 3 to 9% of CdO.

DESCRIPTION OF THE PREFERRED EMBODIMENTS

Figure 4:
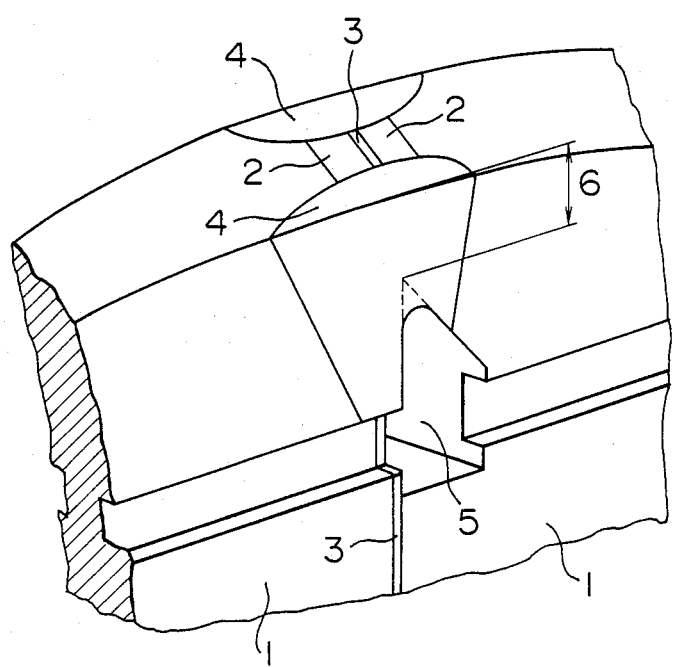

The invention is illustrated hereunder with reference to Examples, Comparative Examples, FIG. 2 and FIG. 4.

FIG. 4 represents the structure of a head. In FIG. 4, 1 denotes ferrite material, 2 amorphous material of the composition $_{81}Co_{13}Nb_6Zr$ in terms of atomic percentage, 3 gap glass, 4 reinforcing glass characteristic of this invention, 5 opening for winding, 6 gap depth, and 7 coil. The gap glass 3 and the reinforcing glass 4 may be of the same composition or the gap glass 3 may be $SiO_2$ alone or a laminate of $SiO_2$ and a glass of the same composition as that of reinforcing glass 4.

In the table, Nos. 1 to 17 show compositions and characteristics of the glasses of this invention. The glass casting, the bonding of base material and the gap formation were performed under a nitrogen atmosphere at 480° C. for 30 minutes. As is apparent from the table, the sealing glass of this invention has a thermal expansion coefficient of $(92 \text{ to } 100) \times 10^{-7}/°C$. which is suitable for the base material. The working temperature are all 480° C. which is lower than the crystallization temperature $(T_x)$ of the amorphous material and, hence, exerts no influence on the amorphous material and ferrite material. As is apparent from the characteristics shown in the table, the sealing glasses are excellent in fluidity and transparency and are free from bubbles and haze. The incidence of head breakage due to cutting was as low as 9 to 16%. The water resistance was tested by inspecting the change in glass surface after immersion of a head chip in purified water at 60° C. for one hour.

In the cases (Nos. 18 to 20 of the table) wherein glasses of the conventional composition containing no CdO were used, the transparency of glasses was poor an the incidence of head breakage was as high as 78 to 88%, indicating unsuitableness for practical uses.

As shown in Nos. 21 to 25 of the table, in the cases wherein any of the ingredients, ZnO, $Al_2O_3$ and CdO, is either in excess or deficient, there occurs insufficient fluidity, reaction with the head material, poor transparency, or head breakage due to unmatched thermal expansion coefficients, indicating the unsuitableness for practical uses.

Nos. 26 and 27 of the table show the results of the tests on the glasses of the composition in which $PbF_2$ was used as a part of ingredients. Both glasses were evaluated unsuitable because of bubbles, haze and insufficient transparency.

Nos. 28 to 36 of the table show the results of tests performed on the glasses incorporated with MO (M is Na, K, Li or V) or $PbF_2$ to lower the softening point, as already disclosed. These glasses were evaluated unsuitable because of the reactivity with the head material, bubbles or haze, insufficient transparency or head breakage.

A $SiO_2$ content of the glass exceeding 7% is undesirable because of the reduction in thermal expansion coefficient, whereas a $SiO_2$ content below 2% gives rise to a problem in chemical stability of the glass.

A $B_2O_3$ content of the glass composition exceeding 11% is deleterious to the chemical durability of the glass, whereas if the content is below 4%, the softening point of the glass becomes high. A PbO content of the glass composition below 70% gives rise to a glass having too high a softening point which makes it impossible to perform sealing at a working temperature of 500° C. or below, whereas if it exceeds 85%, the glass becomes poor in chemical durability. ZnO is added to the glass composition in the field of common glass industry in most of the cases for the purpose of improving chemical durability. A ZnO content exceeding 7% is undesirable, because the glass tends to become devitrified. Similarly to ZnO, $Al_2O_3$ is added to the glass composition to improve chemical stability. If the $Al_2O_3$ content exceeds 5%, the softening point of the glass becomes too high and, hence, the glass does not become fluid at a working temperature of 500° C. or below. A CdO content of the glass composition below 3% is not effective in improving the strength, while if it exceeds 15%, the thermal expansion coefficient of the glass becomes too large.

Figure 1:
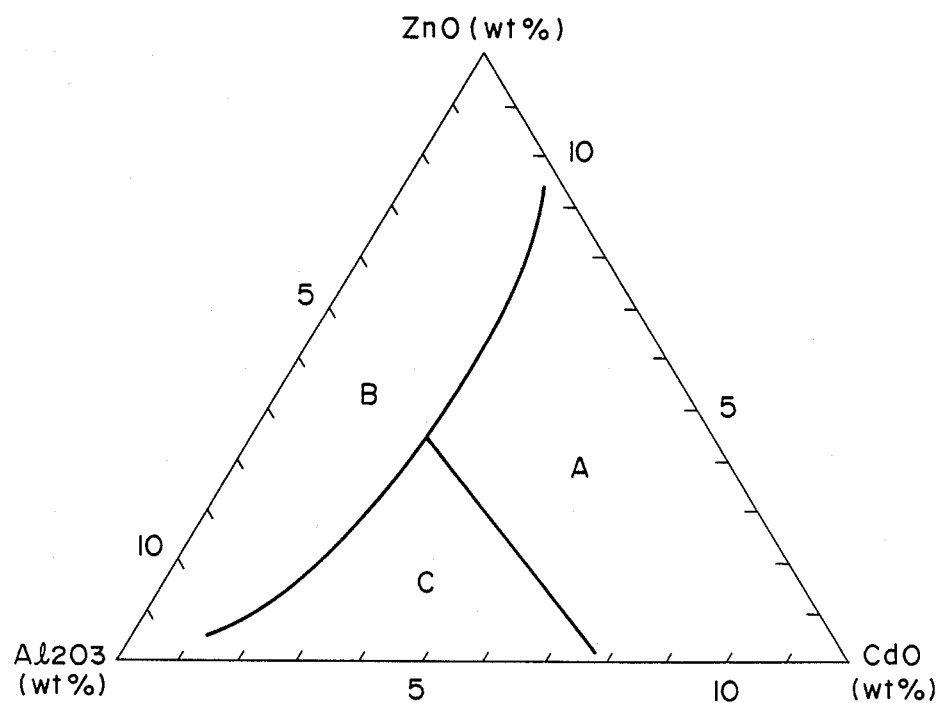
FIG. 1 is a diagram representing the proportions of the additional ingredients ZnO, $Al_2O_3$ and CdO in an example of the sealing glass of this invention comprising a total of 13% by weight of $SiO_2$ and $B_2O_3$ and 75% by weight of PbO, to which are added a total of 12% by weight of base ingredients ZnO, $Al_2O_3$ and CdO.

FIG. 1 is a diagram representing the proportions of additional ingredients ZnO, $Al_2O_3$ and CdO in an example of sealing glass comprising base ingredients including a total of 13% by weight of $SiO_2$ and $B_2O_3$ and 75% by weight of PbO and additional ingredients including a total of 12% by weight of ZnO, $Al_2O_3$ and CdO. The sealing glass of this invention is composed of a fundamental composition, which occupies the region A (region of vitrification) and the proportions of other ingredients are varied depending upon the PbO content. In FIG. 1, the region B is a region susceptible to devitrification and the region C is a region of excessively high softening points (420° C. or above).

The sealing glass of this invention may contain, in addition to the above essential ingredients, those ingredients which lower the softening point such as $Tl_2O$, $Bi_2O_3$ and alkali metal oxides such as $K_2O$, $Na_2O$ and LiO. The glass may further contain 0.2 to 1% of $Sb_2O_3$ as refining agent, suitable amount of $As_2O_3$ and metal oxides in amounts not causing devitrification.

The raw materials for these glasses are $SiO_2$, $H_3BO_3$, $Pb_3O_4$, ZnO, $Al_2O_3$ and CdO; other raw materials for the ingredients other than essential ones are corresponding oxides, carbonates or nitrates. The raw materials are blended according to the prescribed formulation, then melted in a chamotte, alumina, platinum or graphite crucible by heating at 900° to 1100° C. for 20 to 30 minutes. The melt is quenched in water or on a twin roller, then ground, and processed into fibrous form of 1 mm in diameter to facilitate subsequent working.

The sealing glass of this invention can, of course, be used for a conventional head comprising ferrite material alone.

Although the subject of foregoing detailed description is the sealing of a magnetic head material, it is needless to say that the sealing glass of this invention can be used in bonding metals such as, for example, platinum, titanium and ferri-chrome alloy, and glasses such as, for example, soda-lime glass and lead-potash glass, in which thermal expansion coefficient is close to the glasses of this invention sealing of cathode ray tubes, hermetic sealing and sheathed heater.

| Composition and characteristics | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Glass ingredients (% by weight) | | | | | | | | | | | | | | | | | |
| $SiO_2$ | 4 | 3.8 | 4 | 3.8 | 2 | 7 | 6.5 | 6.5 | 4 | 4 | 5.2 | 6.5 | 5.2 | 4.5 | 4.5 | 2 | 3 |
| $B_2O_3$ | 4 | 8.7 | 9 | 8.7 | 15 | 6.5 | 6.5 | 6.5 | 9 | 9 | 7.8 | 6.5 | 7.8 | 10.5 | 10.5 | 11 | 10 |
| PbO | 85 | 75 | 75 | 74.5 | 75 | 75 | 70 | 70 | 75 | 70 | 75 | 75 | 75 | 75 | 75 | 75 | 70 |
| ZnO | 1 | 6.4 | 3 | 6.4 | 1 | 1.5 | 2.5 | 2.5 | 2 | 1 | 3.5 | 4 | 3 | 4 | 2 | 1 | 7 |
| $Al_2O_3$ | 1 | 2.4 | 2.5 | 2.4 | 2 | 2 | 1.5 | 1.5 | 1 | | 2 | 1.5 | 2.5 | 3 | 1.5 | 5 | 2 |
| CdO | 5 | 3.4 | 6.5 | 3.7 | 5 | 8 | 8 | 8 | 9 | 15 | 6.5 | 6.5 | 6.5 | 3 | 6.5 | 6 | 8 |
| $Tl_2O$ | | | | | | | 5 | | | | | | | | | | |
| $Bi_2O_3$ | | | | | | | | 5 | | | | | | | | | |
| $Sb_2O_3$ | | 0.3 | | 0.3 | | 0.5 | | | | | | | | | | | |
| Thermal expansion coefficient ($\times 10^{-7}$/°C.) | 100 | 97 | 96 | 95 | 93 | 94 | 97 | 96.5 | 98 | 95 | 96 | 97 | 93 | 92 | 92 | 92 | 93 |
| Softening point (°C.) | 372 | 390 | 400 | 400 | 405 | 410 | 397 | 398 | 386 | 400 | 408 | 407 | 410 | 408 | 409 | 410 | 410 |
| Working temperature (°C.) | 480 | 480 | 480 | 480 | 480 | 480 | 480 | 480 | 480 | 480 | 480 | 480 | 480 | 480 | 480 | 480 | 480 |
| Fluidity of glass | ○○○○ | ○○○○ | ○○○○ | ○○○○ | ○○○○ | ○○○○ | ○○○○ | ○○○○ | ○○○○ | ○○○○ | ○○○○ | ○○○○ | ○○○○ | ○○○○ | ○○○○ | ○○○○ | ○○○○ |
| Reaction with head material | ○ | ○ | ○ | ○ | ○ | ○ | ○ | ○ | ○ | ○ | ○ | ○ | ○ | ○ | ○ | ○ | ○ |
| Bubble and haze in glass | | | | | | | | | | | | | | | | | |
| Transparency in glass | | | | | | | | | | | | | | | | | |
| Head breakage (%) | 16 | 12 | 10 | 11 | 10 | 10 | 11 | 13 | 13 | 15 | 14 | 16 | 10 | 9 | 9 | 14 | 11 |
| Water resistance of glass | △ | △ | △ | ⊙ | △ | △ | △ | △ | △ | △ | △ | △ | △ | △ | △ | △ | △ |
| Overall evaluation | ○ | ⊙ | ⊙ | ⊙ | ○ | ○ | ○ | ○ | ○ | ○ | ○ | ○ | ○ | ○ | ○ | ○ | ○ |

| Composition and characteristics | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|
| Glass ingredients (% by weight) | | | | | | | | | | | | | | | | | | | |
| $SiO_2$ | 2 | 0 | 8.5 | 4 | 4 | 4 | 4 | 4 | 8.5 | 8.5 | 0.69 | 1.5 | 1 | 0.5 | 2 | 0.2 | 1 | 0.5 | 0.3 |
| $B_2O_3$ | 15 | 17 | 8.5 | 9 | 9 | 9 | 9 | 9 | 8.5 | 8.5 | 16.08 | 7.56 | 12.4 | 11.3 | 7.2 | 8.7 | 17 | 8 | 11.2 |
| PbO | 80 | 80 | 80 | 75 | 75 | 75 | 70 | 75 | 67 | 73 | 73.75 | 78.62 | 75.7 | 67.9 | 58.8 | 55.6 | 70 | 75.5 | 78.5 |
| ZnO | 1 | 1 | 1 | 8 | 1 | 0 | 0 | 6.5 | 1 | 1 | 8.07 | 8.9 | 5 | 5.7 | 2 | 2 | 6 | 4 | 2 |
| $Al_2O_3$ | 2 | 2 | 2 | 0.5 | 6 | 9 | 17 | 0 | 2 | 2 | 0.47 | 0.38 | | 0.5 | | | 1 | | |
| CdO | | | | 3 | 5 | 3 | | 5.5 | | | | | | | | | | | |
| $Tl_2O$ | | | | | | | | | | | | | | | | | | | |
| MO | | | | | | | | | | | $K_2O$ 0.68 0.26 | $K_2O$ 1.91 1.13 | | | 16.8 | 21.2 | $K_2O$ 2 | 4 $V_2O_5$ 0.5 $SnO_2$ 0.4 | $V_2O_5$ 0.3 $SnO_2$ 0.2 |
| CaO | | | | | | | | | | | 0.68 | | | | | | 2 | | |
| BaO | | | | | | | | | | | | | | | | | 1 | | |
| CoO | | | | | | | | | | | | | | | | | | | |
| $PbF_2$ | | | | 0.5 | | | | | | | | | | | | | | | |
| $Bi_2O_3$ | | | | | | | | | 13 | 7 | | | 5.9 | 9.4 | 13 | 12.2 | | 7 | 7.5 |
| $Sb_2O_3$ | | | | | | | | | | | | | | | | | | | |
| Thermal expansion coefficient ($\times 10^{-7}$/°C.) | 92 | 86.5 | 95 | 91 | 92.2 | 90 | 80 | 98 | 97.6 | 97.1 | 95 | 107 | 101 | 109 | 113 | 129 | 103 | 61 | 71 |
| Softening point (°C.) | 400 | 395 | 410 | 427 | 450 | 445 | 395 | 390 | 395 | 400 | 393 | 361 | 360 | 340 | 329 | 299 | 399 | 343 | 360 |
| Working temperature (°C.) | 480 | 480 | 480 | 480 | 480 | 480 | 480 | 480 | 480 | 480 | 480 | 480 | 480 | 480 | 480 | 480 | 480 | 480 | 480 |
| Fluidity of glass | ○○○○ | ○○○ | ○○○○ | × | × | × | ○○○○ | × | ○○ | ○○ | ○○ | ○○ | ○○ | ○○ | ○○ | ○○ | × | ○○○○ | ○○○○ |
| Reaction with head material | ○ | △ | ○ | ○ | | | ○ | × | × | × | × | × | × | × | × | × | ○ | ○ | ○ |
| Bubble and haze in glass | △ | △ | △ | 3 | | | | 15 | | | △ | | | | | | × | | |
| Transparency in glass | 81 | 88 | 78 | | | | 90 | △ | 82 | 81 | 87 | 85 | 80 | 79 | 81 | 75 | 85 | 90 | 90 |
| Head breakage (%) | × | × | △ | △ | △ | △ | △ | △ | × | × | × | × | × | × | × | × | × | × | × |
| Water resistance of glass | × | × | × | × | × | × | × | × | × | × | × | × | × | × | × | × | × | × | × |
| Overall evaluation | × | × | × | × | × | × | × | × | × | × | × | × | × | × | × | × | × | × | × |

What is claimed is:

1. A sealing glass for bonding a magnetic head comprising at least as ingredients, in terms of percent by weight, 2 to 7% of $SiO_2$, 4 to 11% of $B_2O_3$, 70 to 85% of PbO, 1 to 7% of ZnO, 1 to 5% of $Al_2O_3$, and 3 to 15% of CdO, said sealing glass being crack-resistant, transparent, bubble-free, haze-free, having no deep color and having sufficient fluidity at a working temperature $\leq 500°$ C., and being inert with respect to materials contained within said magnetic head and having excellent chemical durability.

2. A sealing glass according to claim 1, wherein the ingredient contents, in terms of percent by weight, are at least 3.5 to 5.5% of $SiO_2$, 8 to 9% of $B_2O_3$, 73 to 75% of PbO, 2 to 6.5% of ZnO, 1.5 to 2.5% of $Al_2O_3$, and 3 to 9% of CdO.

3. A sealing glass according to claim 1, wherein an additional ingredient is 0.5% by weight of $Sb_2O_3$.

4. A sealing glass according to claim 1, wherein an additional ingredient is 0.3% by weight of $Sb_2O_3$.

5. A sealing glass according to claim 1, wherein an additional ingredient is 5% by weight of $Tl_2O$.

6. A sealing glass according to claim 1, wherein an additional ingredient is 5% by weight of $Bi_2O_3$.

7. A sealing glass for bonding a magnetic head comprising at least as ingredients, in terms of percent by weight, 3.5 to 5.5% $SiO_2$, 8 to 9% of $B_2O_3$, 73 to 75% of PbO, 2 to 6.5% of ZnO, 1.5 to 2.5% of $Al_2O_3$, 3 to 9% of CdO, and, in addition, 0.3% of $Sb_2O_3$, said sealing glass being crack-resistant, transparent, bubble-free, haze-free, having no deep color having sufficient fluidity at a working temperature $\leq 500°$ C., and being inert with respect to materials contained within said magnetic head and having excellent chemical durability.

8. A sealing glass according to claim 7, wherein the ingredient contents, in terms of percent by weight, are 3.8% of $SiO_2$, 8.7% of $B_2O_3$, 74.7 to 75% of PbO, 6.4% of ZnO, 2.4% of $Al_2O_3$, 3.4 to 3.7% of CdO, and, in addition, 0.3% of $Sb_2O_3$.

* * * * *